United States Patent [19]

Dau

[11] 4,199,258

[45] Apr. 22, 1980

[54] DISTANCE MEASURING DEVICE AND METHOD

[75] Inventor: Gary J. Dau, Palo Alto, Calif.

[73] Assignee: Electric Power Research Institute, Inc., Palo Alto, Calif.

[21] Appl. No.: 896,350

[22] Filed: Apr. 14, 1978

[51] Int. Cl.² .............................................. G01B 11/14
[52] U.S. Cl. .................................. 356/378; 33/125 B; 356/241
[58] Field of Search ................... 356/1, 241, 378, 376, 356/381; 33/125 A, 125 B, 178 F; 250/268, 358 P

[56] References Cited

U.S. PATENT DOCUMENTS

| | | | |
|---|---|---|---|
| 2,596,024 | 5/1952 | Goble et al. | 33/178 F |
| 3,637,314 | 1/1972 | Groot | 356/445 |
| 3,667,846 | 6/1972 | Nater et al. | 356/376 |
| 3,977,468 | 8/1976 | Brewer et al. | 33/178 F |
| 4,040,738 | 8/1977 | Wagner | 33/287 |

FOREIGN PATENT DOCUMENTS 2306187 8/1974 Fed. Rep. of Germany .......... 356/156

*Primary Examiner*—John K. Corbin
*Assistant Examiner*—R. A. Rosenberger
*Attorney, Agent, or Firm*—Flehr, Hohbach, Test

[57] ABSTRACT

A distance measuring device especially suitable for use in a method of measuring the internal configuration of a tube is disclosed herein. This device utilizes at least one photodetecting arrangement including a plurality of individual photocells and means for mounting the photocells in a linear array. The device also includes at least one optical fiber for directing a beam of light from a source towards a point on the surface to be measured, for example, on the inner surface of a tube, and means for supporting the optical fiber and array of photocells relative to one another and to the surface to be measured such that the beam is reflected off of the point and onto a particular one of the photocells, depending upon the distance between these points and the array of photocells.

4 Claims, 4 Drawing Figures

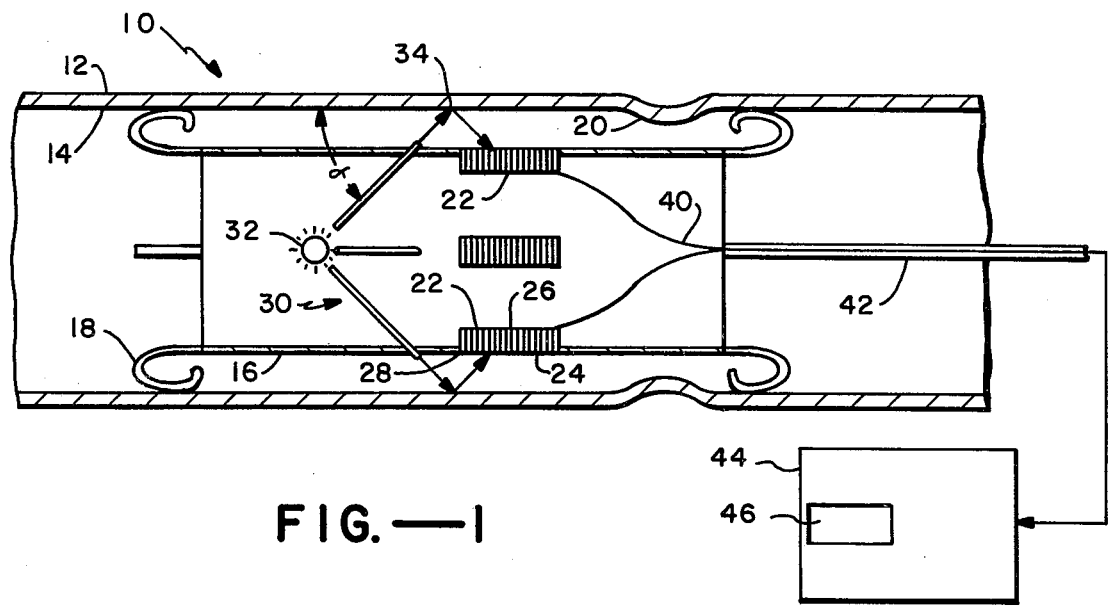
FIG.—1
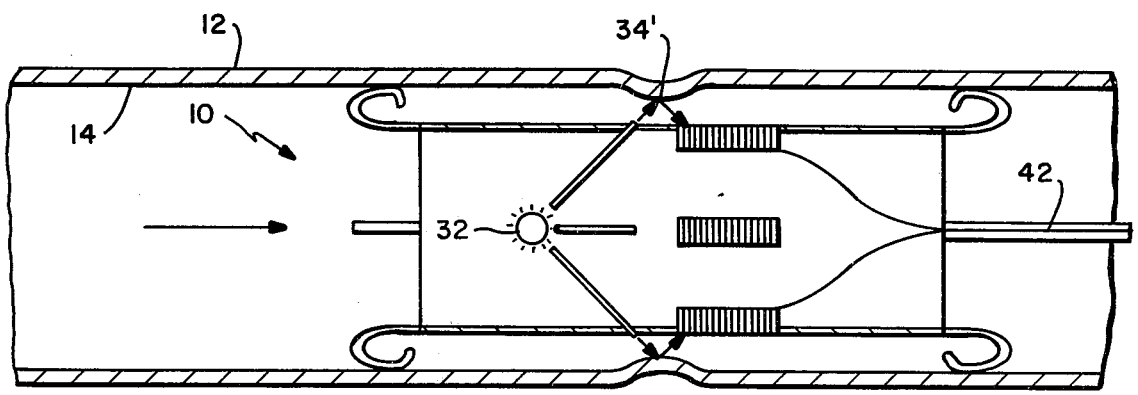
FIG.—2
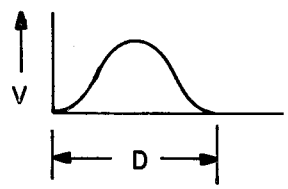
FIG.—3
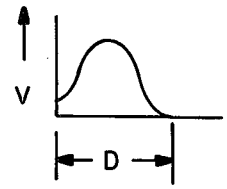
FIG.—4

DISTANCE MEASURING DEVICE AND METHOD

BACKGROUND OF THE INVENTION

The present invention relates generally to distance measuring devices and more particularly to a non-contacting optical device for measuring the inner diameter and inner cross sectional profile of a tube.

There are many ways to measure distance, both by direct contact, and optically. However, there has not heretofore been a completely satisfactory method of measuring the inner diameter and/or the entire inner cross sectional profile or configuration of a tube.

As will be seen hereinafter, the present invention combines fiber optics with an array of photocells, particularly light sensitive diodes in a preferred embodiment, to provide an uncomplicated and economical distance measuring device and yet one which is reliable in use. This particular device is especially suitable for detecting dents in the secondary lines of a steam generator. "Denting" is the term used to describe the results of a corrosion process that occurs on the secondary side of the generator. Corrosion products, principally non-protective magnetite, builds up in the gap (crevice region) between the outer diameter surface and the surface of the carbon steel support plate comprising part of the generator's secondary side. With time, the thickness of this deposit grows and compresses or dents the tube, in the tube support plate region. During the initial stages of compression, the internal diameter is believed to decrease uniformly. However, at some point, this uniform decrease in internal configuration assumes an oval contour. More recently, some evidence has indicated that ovalization is followed by a tube contour assuming a kidney bean shape. Because of the diametrical changes associated with this progression of denting, it is valuable to have a device that traverses the inner diameter of the tube and makes sufficient diametrical measurements to indicate the extent of denting. As will be seen hereinafter, the distance measuring device constructed in accordance with the present invention is particularly suitable for this type of application.

SUMMARY OF THE INVENTION

One object of the present invention is to provide an uncomplicated and economical distance measuring device and yet one which is reliable in use.

Another object of the present invention is to combine fiber optics with an array of photocells to provide a non-contacting type of distance measuring device which is especially suitable for measuring the internal profile or configuration of a tube, such as the secondary tubing in a steam generator.

Still another object of the present invention is to provide a method of measuring the internal profile or configuration of a tube utilizing a device of the type just recited.

The distance measuring device constructed in accordance with the present invention utilizes a photodetecting arrangement including a plurality of individual photocells, specifically light sensitive diodes in a preferred embodiment, and means for mounting the photo cells in a linear array. The device also utilizes a light source and means including at least one optical fiber for directing a beam of light from the source towards a point on the surface to be measured. Both the optical fiber and array of photocells are supported relative to one another and to the surface being measured such that the beam is reflected off of the point of impingement and onto a particular one of the photocells, depending upon the distance between that point and the photocell array.

In a preferred embodiment, as will be seen hereinafter, the device just recited is provided for measuring the internal configuration of a tube and includes a plurality of photodetecting arrangements and an equal plurality of associated optical fibers. These fibers and the arrays of photocells comprising the photo-detecting arrangements are supported within the tube relative to each other and to the internal surface (1) such that the beams of light from the various optical fibers impinge on the internal surface of the tube at points which lie in a common plane normal to the axis of the tube and (2) such that each of these beams is reflected off of the internal surface of the tube and onto a particular one of the photocells of an associated array, depending upon the distance between the corresponding point and associated array.

BRIEF DESCRIPTION OF THE DRAWING

FIG. 1 is a diametral sectional view of a distance measuring device constructed in accordance with the present invention and particularly illustrates the device measuring the inner diameter and/or internal profile of a tube.

FIG. 2 is a diametral sectional view illustrating the distance measuring device at a different point along the length of the tube.

FIG. 3 is a graphic illustration of the voltage vs. distance associated with the position of the measuring device in FIG. 1.

FIG. 4 is a graphic illustration of voltage vs. distance associated with position of the measuring device of FIG. 2.

DETAILED DESCRIPTION AND PREFERRED EMBODIMENTS

Turning to the drawing, wherein like components are designated by like reference numerals throughout the two figures, a distance measuring device constructed in accordance with the present invention and generally designated by the reference numeral 10 is illustrated. This device is shown in FIG. 1 within a tube 12 having an inner surface 14. The tube may be of any type so long as it is sufficiently large so as to readily receive the device 10 and yet not so large that it would be impractical to measure its inner diameter and/or inner profile by utilizing device 10. As stated previously, device 10 is contemplated for use in the tubing on the secondary side of a steam generator. Tubing of this type will generally have an inner diameter ranging between 0.8 and 0.5 inch.

As illustrated in FIG. 1, device 10 includes a support 16 in the form of a longtitudinally extending cylinder which may be constructed of any suitable material such as aluminum. This support, which of course has an outer cross sectional diameter significantly less than the inner diameter of tube 12, includes a plurality of guides 18 located at opposite ends. In the embodiment illustrated, each end of the cylindrical support includes four equally circumferentially spaced, integrally formed guides. Each of these guides is turned back upon itself so as to provide a certain degree of spring action in a radial directly.

The guides just described are provided for slidably engaging cylindrical support 16 within tube 12 in fixed alignment with the axis of the tube, preferably coaxially therewith or at least such that the axes of the two are parallel to one another. The spring action of the guides will also, to a limited degree, compensate for irregularities in the inner surface of tube 12 such as dents indicated generally at 20. They will also allow the cylindrical support to be slidably engaged within tubing of differing inner diameters, of course within a limited range. In any case, it is desirable for the spring action of the guides to be sufficient to maintain support 16 in a substantially fixed position relative to the axis of the tubing as the support is moved therethrough, as will be discussed hereinafter. However, as will be seen, this is not absolutely critical, particularly where the entire diameter of the tubing is being measured or its entire inner profile. This is because a change in the tubing's inner profile causing the cylindrical support to move slightly closer to one side of the tubing will be compensated for by its movement further from the opposite side.

Having described cylindrical support 16 and its associated guides, attention is now directed to the various optical components which comprise part of device 10. As seen in FIG. 1, these components include a plurality of photodetecting arrangements 22, a total of four in the preferred embodiment. Each of these photodetecting arrangements includes a plurality of individual photocells 24 and means for mounting these photocells in a linear array, for example a mounting block 26. Each of these arrangements is fixedly mounted within cylindrical support 16 by suitable means (not shown), for example by adhesive. As illustrated in FIG. 1, the linear array of photocells associated with each photodetecting arrangement 24 is supported along the surface of cylindrical support 16 in a direction parallel to the axis of the support and in confronting relationship to the inner surface 14 of tubing 12. These photocells are directly exposed to the inner surface of the tubing by means of a suitably sized opening within the cylindrical support, as indicated generally at 28.

As indicated above, there are four photodetecting arrangements in the preferred embodiment of distance measuring device 10. These four arrangements, or for that matter any plurality of such arrangements, are preferably equally circumferentially spaced and diametrally aligned with one another, as illustrated. Moreover, in this preferred embodiment, the photocells 24 are light sensitive diodes which essentially consist of a series of discrete semiconductor elements butted together in a linear fashion. When light strikes one of these elements, a voltage is produced. Typically, arrays can be purchased having widths manufactured to a precision of +20 micro-inches with a 0.0005 inch center-to-center spacing. Commercial arays are available with a variety of sizes, e.g., 128, 256, 512 and 1024 elements or diodes per array. One supplier of such arrays is Reticon Corporation, under the trade name Discrete Time Analog Processing Devices, and another is Fairchild Semi-conductor Co., under the trade name Linear Image Sensor.

Another optical component comprising part of distance measuring device 10 is a fiber optic arrangement 30 associated with each photodetecting arrangement 22 and, hence, four in all in the preferred embodiment, and a common light source 32. This light source is fixedly mounted by suitable means (not shown) within cylindrical support 16 and may be of any conventional type having sufficient power to perform in the manner to be described, for example, having a 0.5 watt output. It is located along the axis of the support 16 in the preferred embodiment, axially spaced a fixed distance from each photodetecting arrangement 22. While this appears to be the most practical location for the light source from the standpoint of simplicity and economy, it will be apparent that the light source does not have to be located in this position and, in fact, could be positioned entirely outside the support. However, as will also become apparent, this would require additional lengths of optical fibers which will be described below and which comprise part of the fiber optics arrangements 30.

Each of the fiber optics arrangements 30 includes at least one optical fiber and preferably an entire fiber optic bundle. As will be seen below, each of these bundles or individual optical fibers (when only one is utilized) is supported in a fixed position relative to the light source and associated linear array of photocells for directing a beam of light from the source towards a point of impingement indicated at 34 on surface 14. Each fiber optics arrangement may include individual support means a common support means may be provided for all of these arrangements and/or these arrangements may be supported at least in part by cylindrical support 16.

As illustrated in FIG. 1, the various fiber optic arrangements and their associated arrays of photocells are positioned within tube 12 relative to each other and to the internal surface 14 thereof (1) such that their corresponding points of impingement 34 are diametrally aligned, that is, aligned in a common plane normal to the axis of the tubing and (2) such that each of these beams of light is reflected off a corresponding one of the points of impingement and onto a particular one of the photocells of an associated array, depending upon the distance between the corresponding point and the associated array. This will be more clearly illustrated hereinafter with respect to FIGS. 2, 3 and 4 in conjunction with FIG. 1. For the moment, it suffices to state that the light pattern reflected from surface 14 onto the various arrays of photocells will depend upon the profile or at least part profile of the tubing's inner diameter at the point of impingement.

In the preferred embodiment of the present invention, each of the fiber optical arrangements 30 is oriented so as to direct the beam of light towards its associated point of impingement 34 at an angle approximately 45 degrees with the axis of cylindrical support 16 and hence 45 degrees with the axis of tubing 12, as indicated at $\alpha$. In this regard, it should be noted that the entire length of each optical fiber bundle (or individual optical fiber) does not have to be fixed in a certain way. In fact, if it were desirable to reposition light source 32 outside cylindrical support 16 or in some other position than that illustrated, the various fiber optic bundles could be lengthened or shortened or otherwise appropriately curved in accordance with the position of the light source. Of course, the outermost beam directing end of each bundle, that is, the point at which the beam of light leaves the bundle, must be fixedly positioned to direct the beam in the manner described. However, inwardly from this point, the bundles can take any reasonable path, keeping in mind practicality and economy.

Whether photodetecting arrangements 22 include light sensitive diodes or other such photocells, each arrangement must include a suitable signal carrying line 40 for carrying light responsive electrical signals to a point where the signal can be processed for evaluating the measurements made by device 10. These signal carrying lines from the various arrangements can be carried through a common cord or handle 42 which may also serve as a mechanical puller for pulling cylindrical support 16 and the various components attached thereto through tubing 12. Moreover, when light source 32 is located within the cylindrical support, as it is in the preferred embodiment, power to the light source may be provided by means of an appropriate conduit (not shown) passing through the common cord or handle.

In addition to the various components just recited, distance measuring device 10 includes conventional signal processing means, generally indicated at 44, for processing the various electrical signals received from lines 40. More specifically, means 44 includes circuitry for evaluating the various signals received so as to provide a readout indicative of the light pattern impinging on the various photocells and hence indicative of the particular parameter being measured, either distance generally, inner diameter of the tubing, and/or the entire inner profile or configuration thereof. The readout circuitry may include a visual readout as indicated at 46 and/or it may include a permanent readout (not shown). In any event, these various components making up means 44 can be readily provided by those skilled in the art and hence will not be described herein.

Having described device 10, attention is now directed to the manner in which it operates. Let it first be assumed that the device is in the position illustrated in FIG. 1. It can be seen that the beam of light associated with each fiber optics arrangement 30 impinging on a corresponding point 34 is reflected to a specific point along the length of an associated array of photocells. If the beam of light were pure and sufficiently narrow and if the individual photocells were sufficiently large, this beam of light would actually impinge upon an individual photocell. In reality, however, the beam impinges upon a number of specific photocells. In this way, the voltage pattern resulting from this impingement of light may look like that illustrated in FIG. 3 where the abscissa represents the distance across the length of the array of photocells and the ordinant represents the magnitude of voltage. Note that the point of interest is actually the peak voltage which may be considered equivalent to the individual photocell which would have received the light beam if the latter was sufficiently confined to a small enough cross section. This peak voltage is representative of the distance (radial distance) between the part of impingement and array of photocells.

The graphic analysis just described with respect to FIG. 3 relates to one particular photodetecting arrangement and associated fiber optics arrangement. In the preferred embodiment illustrated, a plurality of such measurements are simultaneously obtained, one for each point 34, and hence provides sufficient information to determine the inner diameter of tubing 12 at that particular location. Moreover, with a sufficient number of points being measured, the entire inner profile or configuration can be measured. Obviously, the greater the number of points 34 being simultaneously measured, the greater the configurational detail can be obtained. However, it is possible to obtain the entire inner configuration of tubing 12 at the location illustrated in FIG. 1 by using one or at most two photodetecting arrangements and associated fiber optical arrangements. This can be accomplished by rotating the entire cylindrical support 16 and hence the optical components supported thereby about the axis of the support while simultaneously taking the measurements provided at the outputs of the photodetecting arrangements. Processing means 44 could readily include conventional circuitry for processing this information.

Once the appropriate measurements are taken at points 34 illustrated in FIG. 1, support 16 is longtitudinally moved along the length of tubing 12 to a second position illustrated in FIG. 2. In this position, device 10 takes measurement at impingement points 34' which, as noted, are located at inwardly directed dents 20. Note that this causes each of the beams of light to be reflected onto an associated array of photocells at different points along its length. This is best illustrated graphically in FIG. 4. Note that the peak voltage in FIG. 4 is significantly closer to one end of the array than the peak voltage in FIG. 3. This indicates a change in the relative position between the point of impingement and the array of photocells, indicating in the embodiment illustrated a change in diameter.

While device 10 has been described as operating between two distinct locations, specifically between points 34 and points 34', it is to be understood that operation of the device could be provided in a continuous manner. More specifically, the device can be moved in a continuous fashion as measurements are continuously made. The circuitry required to accomplish this can be readily provided within means 44.

What is claimed is:

1. A device for measuring the internal configuration of a tube, comprising:
    (a) a plurality of photodetecting arrangements, each of which includes a group of individual photocells and means for mounting said photocells in a linear array; p1 (b) light producing means;
    (c) means including at least one optical fiber associated with each of said photodetecting arrangements for directing a beam of light from said light producing means towards a point on the internal surface of said tube;
    (d) means including a plurality of guides adapted for engagement against said inner surface of said tube for supporting said optical fibers and arrays of photocells within said tube relative to each other and to said internal surface such that
        (i) each of said linear arrays of photocells extends in a direction parallel to the axis of said tube with said photocells confronting the internal surface thereof,
        (ii) said points on said internal surface lie in a common plane normal to the axis of said tube, and
        (iii) each of said beams is reflected off of a corresponding one of said points and onto a particular one of the photocells of an associated array, depending upon the distance between said corresponding point and associated array; and
    (e) means for indicating which of said photocells receive said beams whereby to determine the distance between said points and associated arrays.

2. A device according to claim 1 wherein each of said beams is directed towards its corresponding point at an angle of about forty-five degrees of said axis.

3. A device according to claim 2 wherein said photocells are light sensitive diodes.

4. A device according to claim 1 wherein said guides provide a limited degree of spring action in the radial direction of said tube whereby to compensate for irregularities in the inner surface of said tube.

* * * * *